Patented Sept. 17, 1929

1,728,772

UNITED STATES PATENT OFFICE

JAMES SILBERSTEIN, OF WILKINSBURG, PENNSYLVANIA, ASSIGNOR TO WESTINGHOUSE ELECTRIC & MANUFACTURING COMPANY, A CORPORATION OF PENNSYLVANIA

SOLDER

No Drawing.    Application filed September 9, 1927. Serial No. 218,574.

My invention relates to the art of joining metals and particularly to soldering materials.

It is among the objects of my invention to provide a solder which has a solidification point intermediate that of the low-melting-point solders, such as the lead-tin alloys, and the high-melting-point silver-zinc-copper alloys, the so-called silver solders.

Another object of my invention is to provide a joint for metals that shall possess great strength at comparatively high temperatures.

Heretofore, two general classes of solders have been used. The low-melting-point solders are alloys which melt at about 230° C. and lower, among which are the lead-tin alloys. Among the other solders, or high-melting-point solders, which have a melting point of about 750° C. and higher, are the silver-zinc-copper alloys. The low-melting-point solders are workable by means of a soldering iron and are satisfactory with respect to strength at ordinary temperatures, but the low-melting-point of the alloy limits the utility of the solder to devices that do not become heated in service. The utility of the high-melting-point solders is limited to its use with materials that will not be injured if they are heated to the comparatively high melting point of the solder.

My invention provides means for joining metallic articles that become heated in service to a temperature above 300° C. and which must be joined at comparatively low temperatures in order to preserve the desired properties of the metal or metals.

I provide a solder that melts at a temperature higher than 300° C. and consists essentially of lead and thallium. Thallium is the only known element or metal which, when alloyed or fused with lead, will raise the solidification point instead of lowering it or keeping it constant. I have discovered that, if thallium is alloyed with lead in even small proportions, an alloy will be obtained which will have the adequate strength, toughness and other properties required for a solder of this type.

I vary the proportions of lead and thallium from 99% to 80% lead to 1% to 20% thallium. The minor impurities usually present in commercial lead and thallium may remain present. Although the above-named variations may be made, I prefer to prepare the solder so that the composition will contain about 97% lead and about 3% thallium. If insufficient thallium is added, the alloy will be soft and lacking in strength. A larger percentage of thallium increases the strength and raises the melting point of the alloy; but, at the present time, as thallium is expensive, for economic reasons, it is desirable that the smallest amount of thallium be added which will produce an alloy of the desired strength and durability. The addition of too much thallium is also harmful, as it has the tendency to raise the melting point of the alloy to such an extent that the alloy cannot be applied, in ordinary practice, by means of a soldering iron.

The solidification point of the preferred composition is about 327° C. At temperatures below the solidification point of the alloy, the strength of the solder is sufficiently constant to rovide the desired properties of a solder. The point of liquefaction of the solder is so low that it may be applied by means of a soldering iron.

My solder may thus be used for making joints in such materials as copper and other metals that are insulated by materials which deteriorate rapidly at the higher temperatures necessary for soldering with the high-melting-point solders, when the insulation is comparatively near the joint. However, if desired, the copper parts may be joined by the process of "sweating", in which the solder in the form of powder or ribbon is placed between the parts to be joined and then the parts are heated electrically or with a flame to the melting temperature of the solder. Such a joint may be made with my solder without injuriously affecting the insulation and other materials in or near the joint.

My solder is particularly useful for making soldered copper joints, although it may be utilized successfully with other metals. Copper parts to be joined, such as copper plates, are cleaned in order to remove foreign matter and oxide, after which a flux, consisting of rosin and alcohol, is applied to the surface to form a film between the copper parts. The solder is then melted by means of a soldering iron and flows between and upon the parts to be soldered together, the flux reacting with the impurities of the metal and cleaning the metallic parts, thus providing a perfectly clean, smooth contact for the metal and solder. When the solder cools, a unitary structure is formed, the joint consisting of copper on each side of a thin adherent film of my solder.

While I have described a specific embodiment of my invention, I do not wish to be limited thereto, as modifications of my invention will be apparent to those skilled in the art without departing from the spirit or scope of my invention as defined in the appended claims.

I claim as my invention:

1. A solder comprising an alloy of lead and thallium in the proportions of 99% to 80% lead and 1% to 20% thallium.

2. A solder comprising lead and thallium in the proportions of about 97% lead and about 3% thallium.

3. A solder comprising an alloy of lead and thallium in the proportions of 99% to 90% lead and 1% to 10% thallium.

4. A solder comprising lead and thallium in the proportions of 99% to 95% lead and 1% to 5% thallium.

5. A composite metal joint comprising portions of copper and an adherent metallic film between said portions consisting of an alloy of thallium and lead in the proportions of 1 to 20 per cent thallium and the remainder lead and minor impurities.

6. A composite metal joint comprising portions of copper and an adherent metallic film between said portions consisting of an alloy of thallium and lead in the proportions of about 3 per cent thallium and the remainder lead and minor impurities.

In testimony whereof, I have hereunto subscribed my name this 31st day of August, 1927.

JAMES SILBERSTEIN.